United States Patent
Arndt et al.

(10) Patent No.: US 8,782,024 B2
(45) Date of Patent: Jul. 15, 2014

(54) MANAGING THE SHARING OF LOGICAL RESOURCES AMONG SEPARATE PARTITIONS OF A LOGICALLY PARTITIONED COMPUTER SYSTEM

(75) Inventors: Richard Louis Arndt, Austin, TX (US); Bruce G. Mealey, Austin, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2852 days.

(21) Appl. No.: 10/777,724

(22) Filed: Feb. 12, 2004

(65) Prior Publication Data

US 2005/0182788 A1  Aug. 18, 2005

(51) Int. Cl.
*G06F 7/00* (2006.01)

(52) U.S. Cl.
USPC .......................................... 707/705; 707/802

(58) Field of Classification Search
USPC ............ 707/1–104.1, 705, 781, 802; 709/226
See application file for complete search history.

(56) References Cited

U.S. PATENT DOCUMENTS

| | | | |
|---|---|---|---|
| 5,659,701 A * | 8/1997 | Amit et al. ................... 719/317 |
| 5,893,097 A * | 4/1999 | Hayata et al. ..................... 1/1 |
| 6,075,938 A * | 6/2000 | Bugnion et al. ................ 703/27 |
| 6,212,635 B1 * | 4/2001 | Reardon ....................... 713/165 |
| 6,289,334 B1 * | 9/2001 | Reiner et al. ..................... 707/3 |
| 6,467,007 B1 * | 10/2002 | Armstrong et al. ........... 710/260 |
| 6,523,027 B1 * | 2/2003 | Underwood ...................... 707/4 |
| 6,601,233 B1 * | 7/2003 | Underwood .................. 717/102 |
| 6,922,685 B2 * | 7/2005 | Greene et al. .................... 707/1 |
| 6,990,666 B2 * | 1/2006 | Hirschfeld et al. ........... 718/104 |
| 7,069,276 B2 * | 6/2006 | Fujita et al. ................... 707/202 |
| 2001/0056500 A1 * | 12/2001 | Farber et al. .................. 709/245 |
| 2002/0099818 A1 * | 7/2002 | Russell et al. ................ 709/224 |
| 2002/0123978 A1 * | 9/2002 | Bird et al. ......................... 707/1 |
| 2002/0147611 A1 * | 10/2002 | Greene et al. ..................... 705/1 |
| 2002/0161891 A1 * | 10/2002 | Higuchi et al. ............... 709/226 |
| 2003/0195942 A1 * | 10/2003 | Muhlestein et al. .......... 709/215 |
| 2004/0003086 A1 * | 1/2004 | Parham et al. ................ 709/226 |
| 2004/0006706 A1 * | 1/2004 | Erlingsson .................... 713/200 |

(Continued)

FOREIGN PATENT DOCUMENTS

TW  485316  5/2002

OTHER PUBLICATIONS

Anderson et al., "Dynamic Partitioning of Switching Elements", IP.com Electronic Publication, May 2003, pp. 1-11.*

(Continued)

*Primary Examiner* — Hung Q Pham
*Assistant Examiner* — Linh Black
(74) *Attorney, Agent, or Firm* — Yee & Associates, P.C.; Matthew W. Baca

(57) ABSTRACT

A mechanism is provided for sharing resources among logical partitions in a logical partitioned data processing system and for managing the changes to resources in such a way that the sharing operating systems are able to handle the various transitions in a graceful manner. Four hypervisor functions plus a specific return code manage the granting of access of resources owned by one partition to another (client) partition, accepting of granted resources by client partitions, returning of granted resources by client partitions, and rescinding of access by the owning partition. These four hypervisor functions are invoked either explicitly by the owning and client partitions or automatically by the hypervisor in response to partition termination. The hypervisor functions provide the needed infrastructure to manage the sharing of logical resources among partitions.

12 Claims, 5 Drawing Sheets

(56) References Cited

U.S. PATENT DOCUMENTS

2004/0010591 A1* 1/2004 Sinn et al. .................... 709/225
2004/0054866 A1* 3/2004 Blumenau et al. ............ 711/202
2004/0133640 A1* 7/2004 Yeager et al. ................. 709/204

OTHER PUBLICATIONS

Cohen, David L., "AFS: NFS on steroids", LAN Techonology, Mar. 1993, pp. 1-13.*
TW search report dated Aug. 23, 2010 regarding application 094103767, filing date Feb. 4, 2005, 1 PAGE.

* cited by examiner

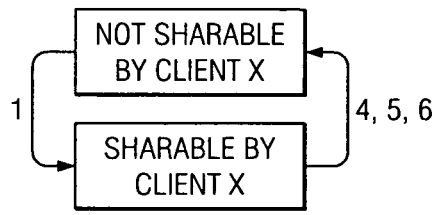
*FIG. 3A*
| | OPERATIONS |
|---|---|
| 1 | H_GRANT_LOGICAL |
| 2 | H_ACCEPT_LOGICAL |
| 3 | H_RETURN_LOGICAL |
| 4 | H_RESCIND_LOGICAL (NORMAL) |
| 5 | H_RESCIND_LOGICAL (FORCED) |
| 6 | Server_Partition_Failure |
| 7 | Client_Partition_Failure |
*FIG. 3B*
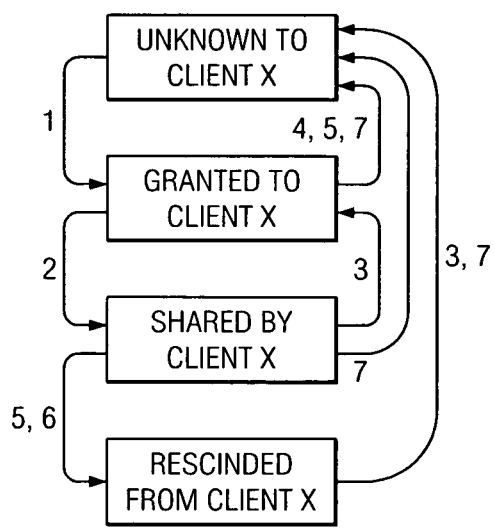
*FIG. 3C*

MANAGING THE SHARING OF LOGICAL
RESOURCES AMONG SEPARATE
PARTITIONS OF A LOGICALLY
PARTITIONED COMPUTER SYSTEM

BACKGROUND OF THE INVENTION

1. Technical Field

The present invention relates to data processing and, in particular, to logically partitioned data processing systems. Still more particularly, the present invention provides a method, apparatus, and program for sharing logical resources among separate partitions in a logically partitioned data processing system.

2. Description of Related Art

Large symmetric multi-processor data processing systems, such as IBM eServer P690, available from International Business Machines Corporation, DHP9000 Superdome Enterprise Server, available from Hewlett-Packard Company, and the Sunfire 15K server, available from Sun Microsystems, Inc. may be partitioned and used as multiple smaller systems. These systems are often referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platform's physical resources. These platform allocable resources include one or more architecturally distinct processors with their interrupt management area, regions of system memory, and input/output (I/O) adapter bus slots. The partition's resources are represented by the platform's firmware to the operating system image.

Each distinct operating system or image of an operating system running within a platform is protected from each other such that software errors on one logical partition cannot affect the correct operation of any of the other partitions. This protection is provided by allocating a disjointed set of platform resources to be directly managed by each operating system image and by providing mechanisms for insuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocable resources within the platform.

With respect to hardware resources in a logical partitioned data processing system, these resources are disjointly shared among various partitions. These resources may include, for example, input/output (I/O) adapters, memory modules, non-volatile random access memory (NVRAM), and hard disk drives. Each partition within an LPAR data processing system may be booted and shut down over and over without having to power-cycle the entire data processing system.

SUMMARY OF THE INVENTION

The present invention provides a mechanism for sharing resources among logical partitions in a logical partitioned data processing system and for managing the changes to resources in such a way that the sharing operating systems are able to handle the various transitions in a graceful manner. The present invention provides four hypervisor functions plus a specific return code to manage the granting of access of resources owned by one partition to another (client) partition, accepting of granted resources by client partitions, returning of granted resources by client partitions, and rescinding of access by the owning partition. These four hypervisor functions are invoked either explicitly by the owning and client partitions or automatically by the hypervisor in response to partition termination. The hypervisor functions provide the needed infrastructure to manage the sharing of logical resources among partitions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A-3C illustrate shared logical resource state transitions in accordance with a preferred embodiment of the present invention;

DETAILED DESCRIPTION OF THE PREFERRED
EMBODIMENT

Figure 1:
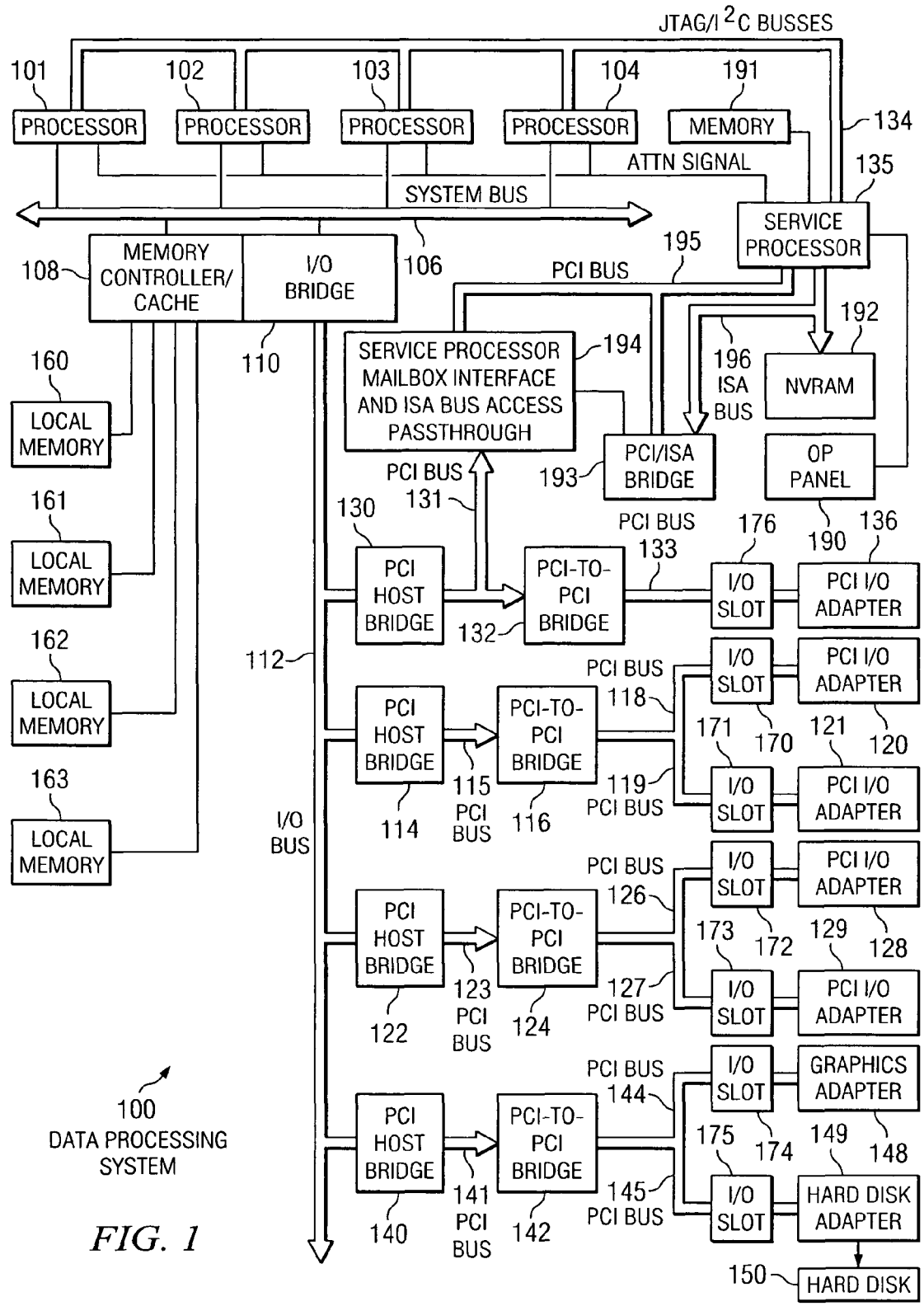
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to one of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P3. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

It a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
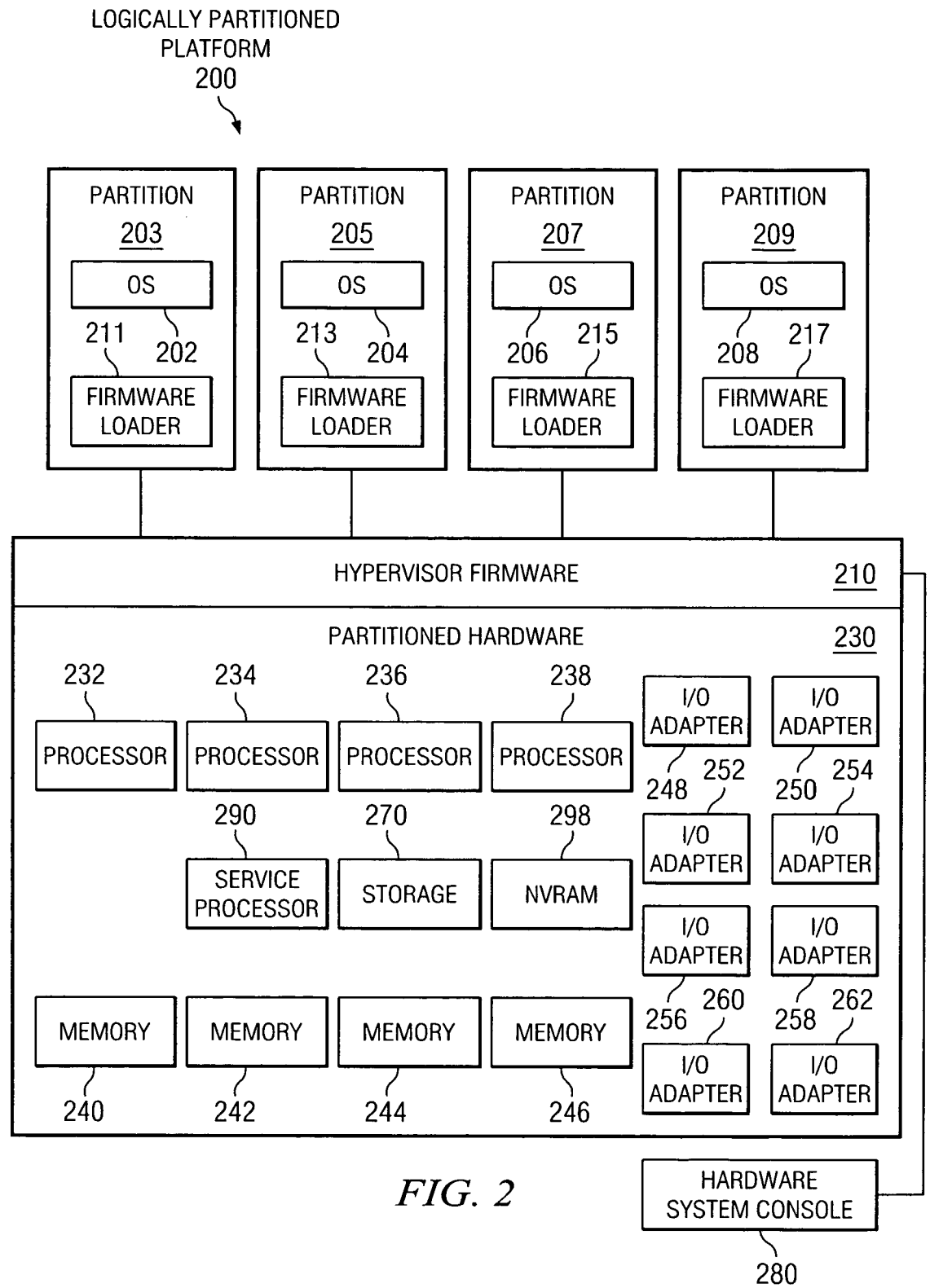
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209.

Additionally, these-partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the hypervisor's partition manager. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Hypervisor firmware 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (nonvolatile RAM). Thus, hypervisor 210 allows the simultaneous execution of independent OS images 202, 204, 206, and 208 by virtualizing all the hardware resources of logical partitioned platform 200.

Operations of the different partitions may be controlled through a hardware management console, such as hardware management console 280. Hardware management console 280 is a separate data processing system from which a system administrator may perform various functions including reallocation of resources to different partitions.

The first order of an LPAR data processing system is to maintain strict isolation between partitions. However, there may be cases in which it may be advantageous for cooperating operating systems to be able to share certain platform resources. One example, without limitation, may be when one owning partition provides direct access to a portion of its I/O adapters for use by one of its client partitions, also known as type-1 virtualization of an I/O adapter. Other examples may include the ability to rapidly communicate among the team of operating systems. This is similar to members of a team of employees who can share access to a common database of sensitive information. In such cases, there are mechanisms put in place to manage access to the database, to ensure that only authorized employees are granted access and that this access can be revoked, should the employee change assignments, be terminated, or should the database owner realize that information is invalid and all use of it must cease. In order for logical resources to be shared in an LPAR system, a set of sharing mechanism must be established.

Accessing data in a computer is simple. In fact, the primary job of an LPAR system is to restrict such access. The LPAR management firmware, also known as a hypervisor, maintains a list of all resources that a given partition may access, and when the operating system attempts to gain access to a new resource, the list is referenced to decide if the access should be granted. Normally, the hypervisor ensures that the resource lists of each partition are disjoint. By allowing a given resource to appear in the resource list of two or more partitions, that resource may be shared.

What is more difficult, and the subject of the present invention, is managing the changes to the resource lists in such a way that the sharing operating systems can handle the various transitions in a graceful manner. In accordance with a preferred embodiment of the present invention, the hypervisor is modified to include four hypervisor functions plus a specific return code to manage the granting of access of resources owned by one partition to another (client) partition, accepting of granted resources by client partitions, returning of granted resources by client partitions, and rescinding of access by the owning partition. These four hypervisor functions are invoked either explicitly by the owning and client partitions or automatically by the hypervisor in response to partition termination. The hypervisor functions provide the needed infrastructure to manage the sharing of logical resources among partitions.

Access to resources is transitioned to and from clients in an orderly fashion, and should either the owning (server) or sharing (client) partition fail, the resources are recovered. The resources should never be lost or "leaked." And to allow the remaining partition of the server/client pair to continue operating, all other hypervisor calls that take as a parameter a logical address of a potentially sharable logical resource, return a unique code in the event that access to the resource has been rescinded. This return code allows the client operating system to restrict the effect of the failure to only the users of the specific resource.

FIGS. 3A-3C illustrate shared logical resource state transitions in accordance with a preferred embodiment of the present invention. FIG. 3A represents the state transitions in the access rights of a given logical resource in a server partition. A logical resource may include, without limitation, a processor, a region of main storage, an I/O adapter register, a platform interrupt, and the like. FIG. 3B depicts the operations that affect resource sharing between a server partition and a client partition. FIG. 3C represents the state transitions in the access rights of a given logical resource in a client partition. A client partition is a partition with which the resource owner is authorized to share resources by its partition definition.

As shown in FIG. 3A, a resource moves from the "not sharable" state to the "sharable" state in a server partition responsive to a grant operation, shown as 1 in FIG. 3B. A resource moves from the "sharable" state to the "not sharable" state responsive to a normal or forced rescind, operations 4 and 5, respectively, in FIG. 3B, or responsive to a server partition failure, operation 6. All unspecified operations are treated as no-operations that do not change the resource's state.

With respect to FIG. 3C, in a client partition, a resource moves from an "unknown" state to a "granted" state responsive to a grant operation, shown as operation 1 in FIG. 3B. The resource moves from a "granted" state back to "unknown" state responsive to a normal or forced rescind, operations 4 and 5, respectively, in FIG. 3B, or responsive to a client partition failure, operation 7.

A resource in a client partition moves from the "granted" state to a "shared" state responsive to an accept operation being performed by the client, operation 2 in FIG. 3B. The resource moves back to a "granted" state responsive to a return operation being performed by the client partition, operation 3, and the resource moves from the "shared" state to an "unknown" state responsive to a client partition failure, operation 7.

A resource in a client partition moves from a "shared" state to a "rescinded" state responsive to a rescind operation by the server partition, operation 5, or responsive to a server partition failure, operation 6. A resource moves from the "rescinded" state back to the "unknown" state responsive to a return operation being performed by the client partition, operation 3, or responsive to a client partition failure, operation 7.

Owners of resources can grant access to any of its resources to one or more client partitions. Granting access is accomplished by requesting that the hypervisor generate a specific "cookie" for that resource for a specific sharing partition. A cookie is an opaque reference number, which identifies an item, such as a resource in this case. The cookie value generated for a resource is unique only within the context of the partition being granted the resource and is unusable for gaining access to the resource by any other partition. The unique cookie is then communicated to the client partition via some communication channel such as TCP/IP etc. The accepting partition then maps the shared resource into its logical address space.

The owning partition may grant shared access of the same logical resource to several clients by generating separate cookies for each client. During the time the resource is shared, both the owner and the sharing partitions have access to the logical resource, the software running in these partitions use private protocols to synchronize control access. Once the resource has been accepted into the client's logical address space, the resource can be used by the client in any way it wishes, including granting permission to one of its own clients.

When the client no longer needs access to the shared logical resource, it destroys any virtual mappings it may have created for the logical resource and returns the logical resource, thus unmapping it from its logical address space. The client could subsequently accept the logical resource again, given that the cookie is still valid. To complete the termination of sharing, the owner partition rescinds the cookie describing the shared resource. Normally, a rescind operation succeeds only if the client has returned the resource. However, the owner can force the rescind in cases where the server partition suspects that the client is incapable of gracefully returning the resource.

In the case of a forced rescind, the hypervisor marks the client partition's logical address map location corresponding to the shared logical resource such that any future hypervisor call that specifies the logical address fails with an H_RESCIND return code. The hypervisor ensures that all the client partition's translation tables contain no references to a physical address of the shared logical resource.

Should the server partition fail, the hypervisor may automatically notify client partitions of the failure using an event message. In addition, the hypervisor recovers any outstanding shared logical resources prior to restarting the server partition. This recovery is preceded by a minimum of two seconds of delay to allow the client partitions time to gracefully return the shared logical resources, then the hypervisor performs the equivalent of a forced rescind operation on all the server partition's shared logical resources, thus ensuring that the resources are in a known sharing state prior to restarting the server partition.

Figure 4:
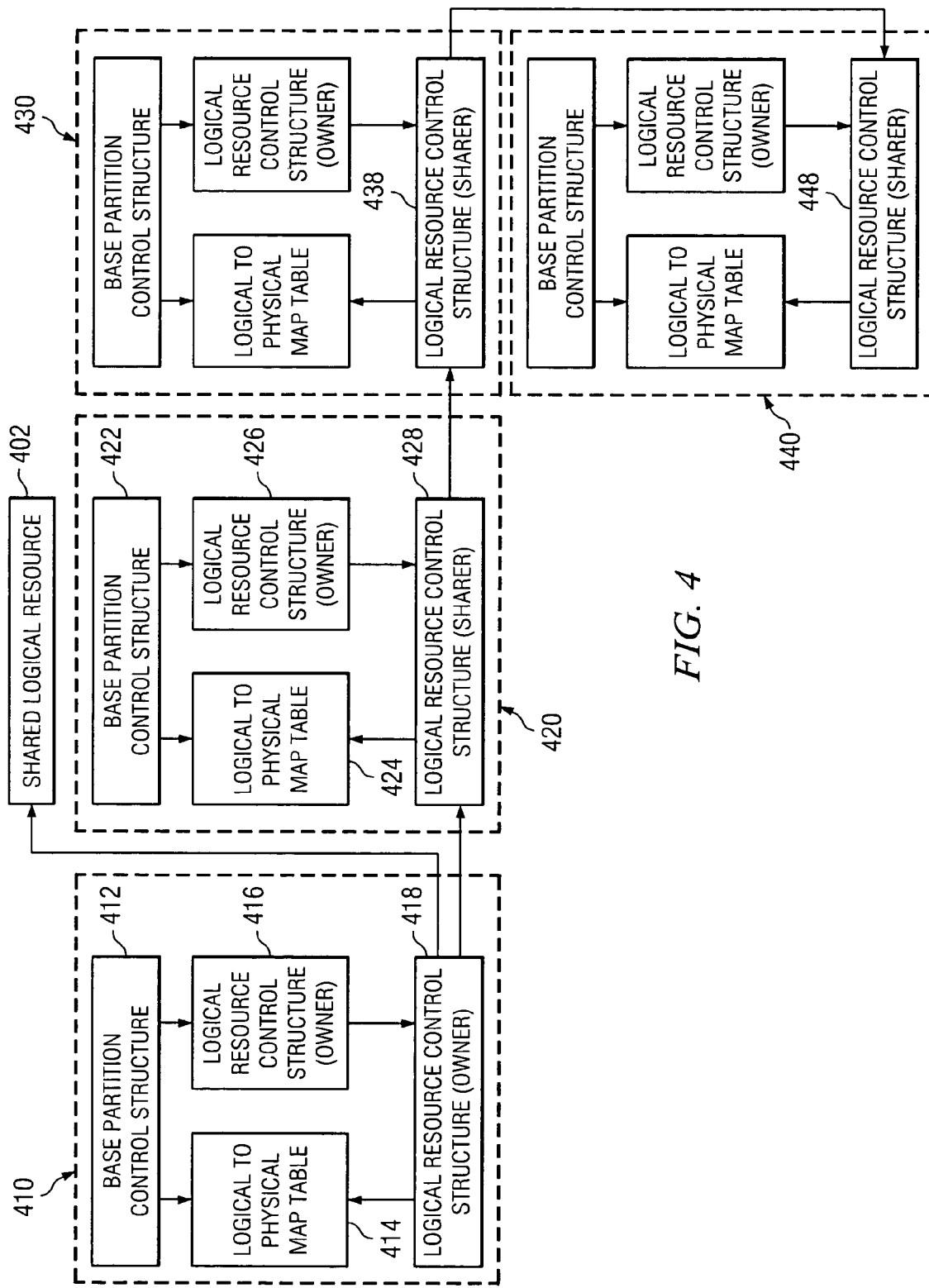
FIG. 4 illustrates an implementation of shared logical resource management in accordance with an exemplary embodiment of the present invention.

FIG. 4 illustrates an implementation of shared logical resource management in accordance with an exemplary embodiment of the present invention. Those of ordinary skill in the art will recognize that several possible implementations exist. The example implementation shown in FIG. 4 is given to clarify the specified functions.

In this example, the hypervisor maintains a logical-to-physical translation table, such as table 414, for each partition. This table is used to verify the partition's virtual-to-logical mapping requests. Each logical resource, such as shared logical resource 402, mapped within the physical-to-logical translation table has associated therewith a logical resource control structure, such as logical resource control structures 416, 418. The original logical resource control structures 416, 418 describe the standard logical resources allocated to the partition due to the partition's definition, such as one per Logical Memory Block (LMB), etc.

The platform firmware, when creating the Open Firmware device tree for a given partition knows the specific configuration of virtual I/O Adapters (IOAs) with the associated quantity of the various types of logical resources types for each virtual IOA. From that knowledge, the firmware understands the number and type of resources that must be shared between the server and client partitions and, therefore, the number of control structures that will be needed. When owning partition 410 grants access to one of its logical resources to another partition, such as partition 420, the hypervisor chooses a logical resource control structure to describe this newly granted resource.

In the example shown in FIG. 4, a server partition 410 includes a base partition control structure 412, a logical-to-physical map table 414, and logical resource control structures 416, 418 for the owner of logical resource 402. The sharing client partition also includes a base partition control structure 422, a logical-to-physical map table 424, and a logical resource control structure for the owner 426. The hypervisor chooses the logical resource control structure for the sharer 428 and attaches (not shown) this control structure to the grantee's base partition control structure 422. As stated above, the required number of control structures is allocated when the client virtual IOA is defined. This logical resource control structure is linked to the base logical resource control structure 418 of the resource owner. Subsequently, the grantee's operating system may accept the shared logical resource and map the resource into the grantee's partition logical-to-physical map table 424.

This same set of operations may subsequently be performed for other partitions, such as partition 430 and partition 440. The shared resource is always a subset of the original, where the subset may potentially comprise the complete set of the original resource or resources. Once a partition, such as partition 430, has accepted a resource, it may subsequently grant a subset of that resource to yet another partition, such as partition 440. The hypervisor creates a logical resource control structure 448 and links it to the logical resource control structure 438 of the granting partition 430. The logical resource control structure 438 is then linked to the logical resource control structure 428 of partition 420, which is in turn linked to the owner's logical resource control structure 418.

For the operating system to return the logical resource represented in control structure 438, the grant represented by control structure 448 must be rescinded. This is normally accomplished only after the operating system that is running in partition 440 performs a return operation, either because it has finished using the logical resource or in response to a request from the owner. Such a request is delivered through an inter-partition communications channel. Exceptions to this normal flow happen when either partition terminates, the return operation is performed by the hypervisor, and when a client is non-responsive, the granter performs a forced rescind.

A return operation is much like a logical resource dynamic reconfiguration isolate operation. The hypervisor removes the logical resource from the partition's logical-to-physical map table to prevent new virtual-to-physical mappings of the logical resource and then ensures that no virtual-to-physical mappings of the logical-resource are outstanding. This may be accomplished synchronously by checking map counts or the like, or asynchronously prior to the completion of the rescind operation.

Figure 5A:
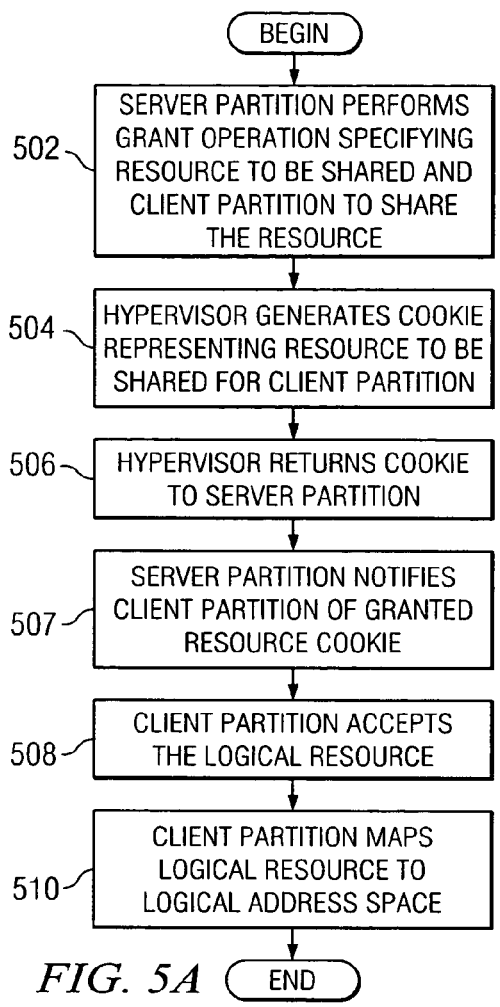
FIGS. 5A-5D are flowcharts illustrating the operation of shared logical resource management in accordance with an exemplary embodiment of the present invention.

FIGS. 5A-5D are flowcharts illustrating the operation of shared logical resource management in accordance with an exemplary embodiment of the present invention. More particularly, FIG. 5A illustrates the operation of granting a logical resource by a server partition to a client partition. The process begins and the server partition performs a grant operation specifying a resource to be shared and a client partition to share the resource (step 502). The hypervisor generates a cookie representing the logical resource to be shared for the client partition (step 504). As stated above, a cookie is an opaque reference number, which identifies an item, such as a resource in this case. Next, the hypervisor returns the cookie for the logical resource to the server partition (step 506). The server partition notifies the client partition of the cookie for the granted resource via inter-partition communications (step 507). The client partition accepts the logical resource (step 508) and maps the logical resource to logical address space in the client partition (step 510). Thereafter, the process ends.

Figure 5B:
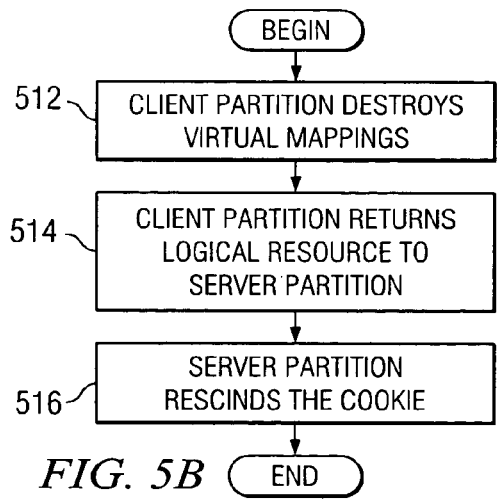

FIG. 5B illustrates an example of a logical resource being rescinded normally from a client partition. The process begins and the client partition destroys virtual mappings for the logical resource (step 512). The client partition then returns the logical resource to the server partition (step 514). At this point, the client could subsequently accept the logical resource again, given that the cookie is still valid. To complete the termination of sharing, the server partition rescinds the cookie describing the shared resource (step 516) and the process ends.

Figure 5C:
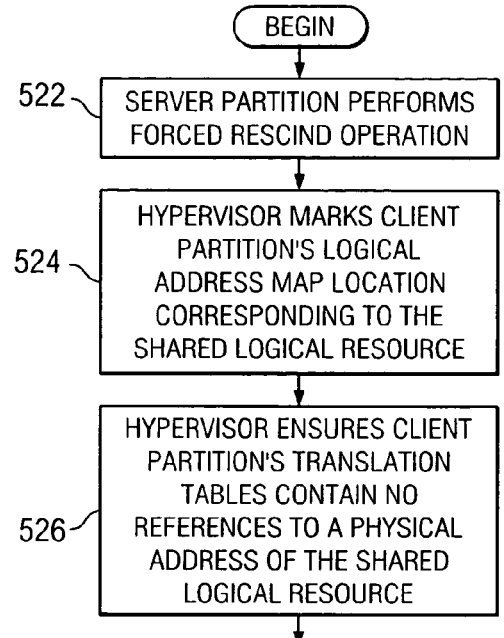

FIG. 5C illustrates a forced rescind in accordance with an exemplary embodiment of the present invention. The process begins and the server partition performs a forced rescind operation (step 522). The hypervisor then marks the client's logical address map locations corresponding to the shared logical resource being rescinded (step 524). Thereafter, the hypervisor ensures that the translation tables of the client partition contain no references to a physical address of the rescinded shared logical resource (step 526) and the process ends.

Figure 5D:
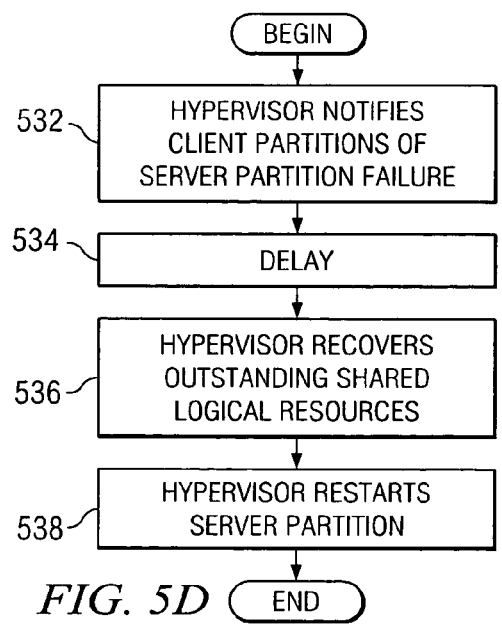

Turning now to FIG. 5D, a flowchart illustrating the operation of a hypervisor responsive to a server partition failure is shown. The process begins and the hypervisor notifies client partitions of the server partition failure (step 532). Then, a delay of, for example, two seconds or more, occurs to allow the client partitions to gracefully return the shared logical resources (step 534). Then, the hypervisor recovers the outstanding shared logical resources (step 536) by performing the equivalent of a forced rescind operation on all of the failed server partition's outstanding shared logical resources. This ensures that the resources are in a known sharing state prior to restarting the server partitions. Thereafter, hypervisor restarts the server partition (step 538) and the process ends.

Thus, the present invention solves the disadvantages of the prior art by providing a mechanism for sharing resources among logical partitions in a logical partitioned data processing system and for managing the changes to resources in such a way that the sharing operating systems are able to handle the various transitions in a graceful manner. The present invention provides four hypervisor functions plus a specific return code to manage the granting of access of resources owned by one partition to another partition, accepting of granted resources by partitions, returning of granted resources by partitions, and rescinding of access by the owning partition. These four hypervisor functions are invoked either explicitly by the owning and client partitions or automatically by the hypervisor in response to partition termination. The hypervisor functions provide the needed infrastructure to manage the sharing of logical resources among partitions.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing shared resources in a logical partitioned computer, the method comprising:
  managing, by a partition manager, a plurality of logical partitions that are included in the computer, wherein each one of the plurality of logical partitions executes one of a plurality of operating systems, and wherein each one of the plurality of logical partitions owns a different plurality of logical resources;
  granting, by a server partition to a client partition, access to one of the plurality of logical resources that are owned by the server partition, wherein the server partition and the client partition are included in the plurality of logical partitions, wherein the client partition is a first client partition;

requesting that the partition manager generate a first identifier that identifies the one of the plurality of logical resources that are owned by the server partition;

generating, by the partition manager, the first identifier;

communicating, by the server partition, the first identifier from the server partition to the first client partition, wherein the first identifier is a cookie that identifies the one of the plurality of logical resources that are owned by the server partition; and responsive to the first client partition accepting the first identifier, mapping the one of the plurality of logical resources that are owned by the server partition into a logical address space of the first client partition, wherein the mapping is performed by the first client partition;

granting, by the first client partition in the logical partitioned computer, the one of the plurality of logical resources that are owned by the server partition to a second client partition in the logical partitioned data processing system;

requesting that the partition manager generate a second identifier that identifies the one of the plurality of logical resources that are owned by the server partition;

generating, by the partition manager, the second identifier;

communicating the second identifier from the first client partition to the second client partition; and responsive to the second client partition accepting the second identifier, mapping the one of the plurality of logical resources that are owned by the server partition into a logical address space of the second client partition, wherein the mapping is performed by the second client partition.

2. The method of claim 1, wherein the first identifier is unique to the first client partition.

3. The method of claim 1, wherein the first identifier is usable by only the first client partition and cannot be used by any other ones of the plurality of partitions to access the one of the plurality of logical resources that are owned by the server partition.

4. The method of claim 1, further comprising:

returning, by the first client partition, the one of the plurality of logical resources that are owned by the server partition to the server partition.

5. The method of claim 4, further comprising:

rescinding, by the server partition, the one of the plurality of logical resources that are owned by the server partition.

6. The method of claim 1, further comprising:

responsive to a determination, at the server partition, that the first client partition is incapable of gracefully returning the one of the plurality of logical resources that are owned by the server partition, performing a forced rescind operation.

7. The method of claim 6, further comprising:

preventing translation tables in the first client partition from containing references to a physical address of the one of the plurality of logical resources that are owned by the server partition.

8. The method of claim 1, further comprising:

responsive to a failure of the server partition, notifying the first client partition of the failure of the server partition;

recovering outstanding shared ones of the plurality of logical resources that are owned by the server partition for the server partition; and restarting the server partition.

9. The method of claim 8, further comprising:

delaying for a period of time prior to the step of recovering the outstanding shared ones of the plurality of logical resources that are owned by the server partition for the server partition.

10. The method of claim 1 further comprising:

granting access to the one of the plurality of logical resources owned by the server partition to the second client partition that is included in the plurality of partitions by:

generating a second identifier that identifies the one of the plurality of logical resources; and communicating the second identifier to the second client partition.

11. The method of claim 1 wherein the one of the plurality of logical resources owned by the server partition is an input/output adapter.

12. The method of claim 1 wherein the one of the plurality of logical resources owned by the server partition is allocated to the server partition.

* * * * *